Nov. 23, 1965　　　W. LANFERMANN　　　3,219,389
DRIVE FOR ADJUSTABLE CUTTING ROLLERS
Filed March 18, 1963　　　　　　　　　　6 Sheets-Sheet 1

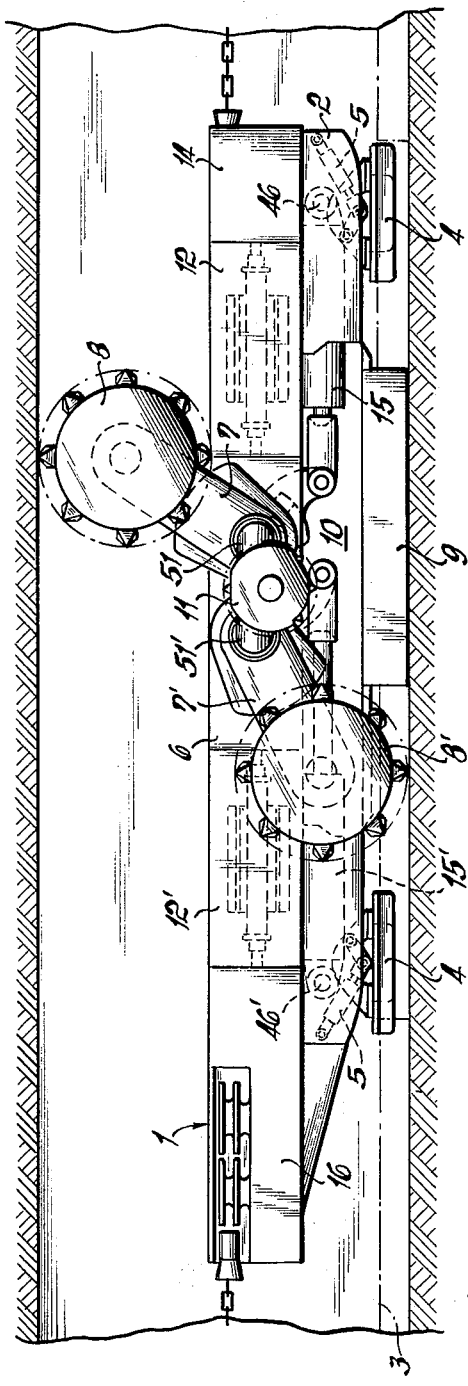

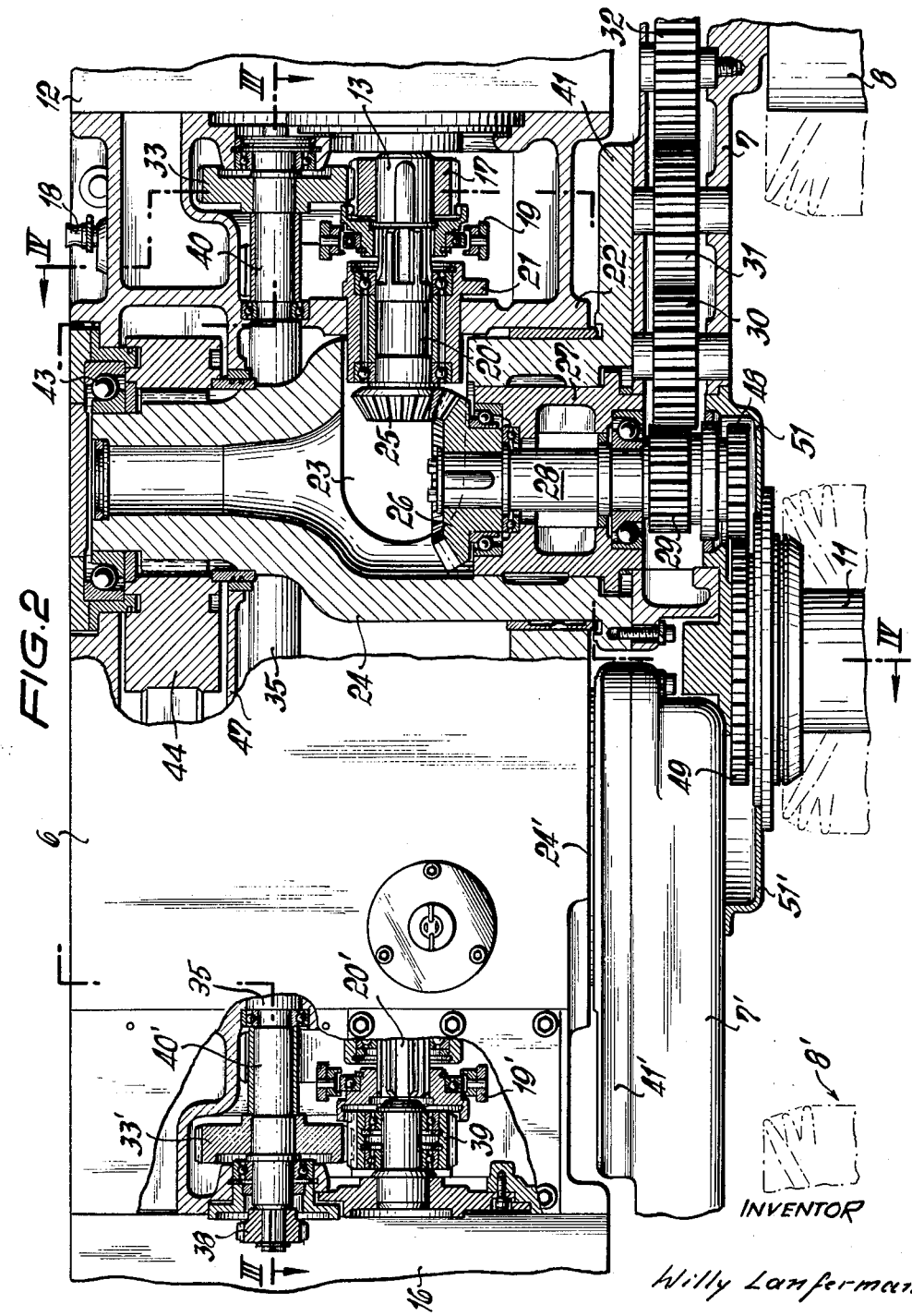

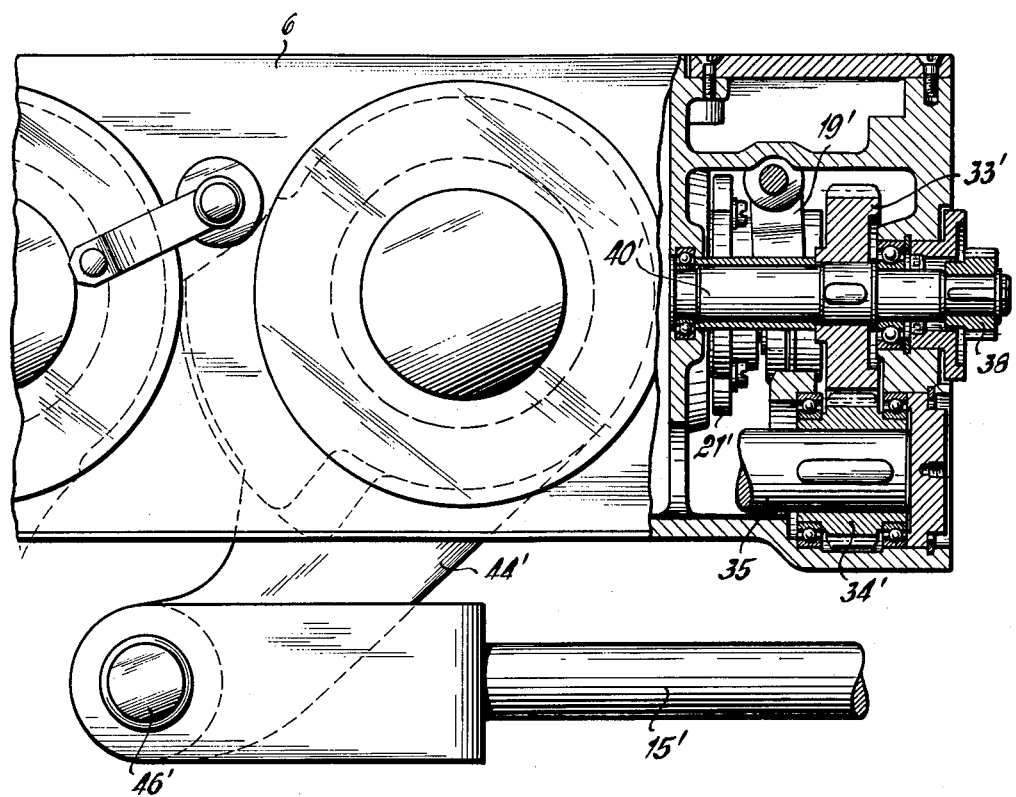

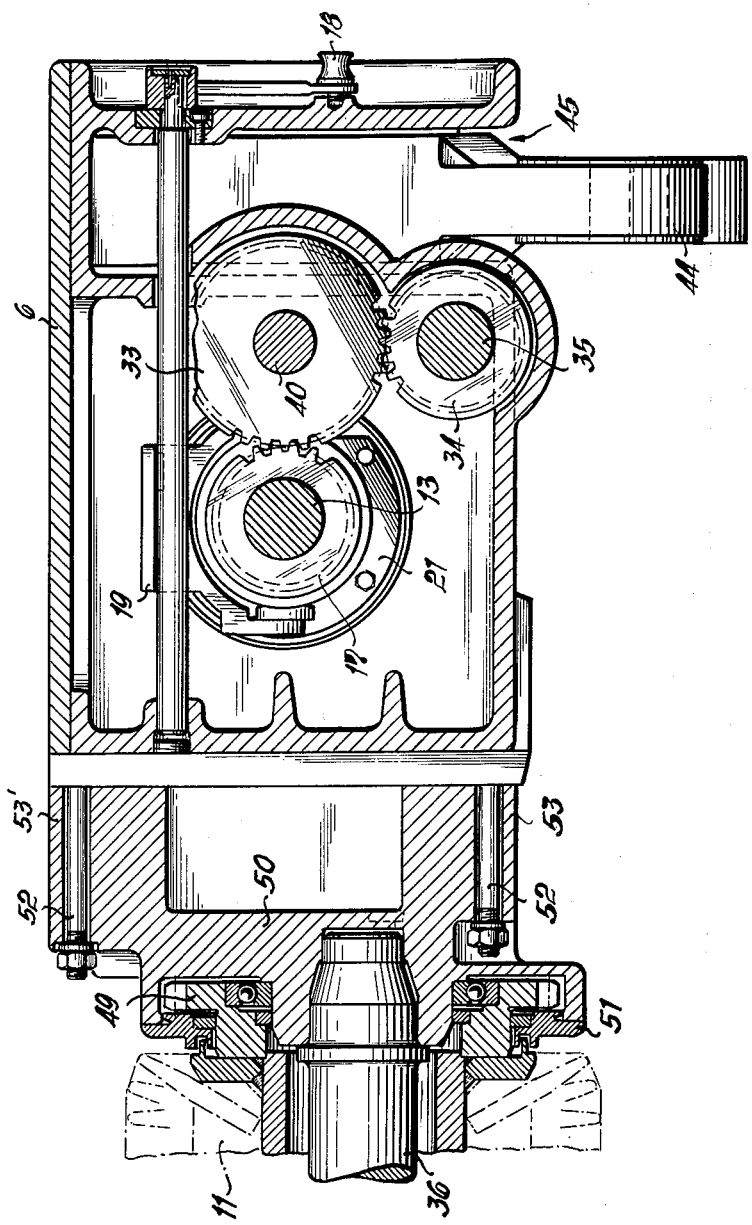

United States Patent Office 3,219,389
Patented Nov. 23, 1965

3,219,389
DRIVE FOR ADJUSTABLE CUTTING ROLLERS
Willy Lanfermann, Bochum, Germany, assignor to
Gebr. Eickhoff, Bochum, Germany
Filed Mar. 18, 1963, Ser. No. 265,861
Claims priority, application Germany, Mar. 22, 1962,
E 22,590
10 Claims. (Cl. 299—53)

The present invention relates to a coal cutting machine, particularly a coal cutting machine with two cutting rollers journalled on supporting arms and adjustable as to height. It is by means of the said two cutting rollers that the coal layer or deposit is worked in both driving directions of the cutting machine.

It is, therefore, an object of the present invention to provide a coal cutting machine having the driving energy supplied thereto through the tilting shaft of the supporting arm for the coal cutting roller, with particularly solid and strong bearing means for the tiltable shaft.

It is another object of the present invention to provide a coal cutting machine as set forth in the preceding paragraph, in which the driving connection between the drive motor and the cutting roller is considerably simplified.

It is a further object of the present invention to provide a coal cutting machine with two motors for respectively driving two coal cutting rollers, in which the available power of each motor will be more economically taken advantage of in either direction of operation of the coal cutting machine.

These and other objects and advantages of the invention will appear more clearly from the following specification in connection with the accompanying drawings, in which:

FIGURE 1a is a view like FIGURE 1 but showing two drive motors.

FIG. 2 illustrates on a somewhat larger scale then FIG. 1 a top view and partly a section of the coal cutting head of a coal cutting machine according to the invention.

Figure 3A:
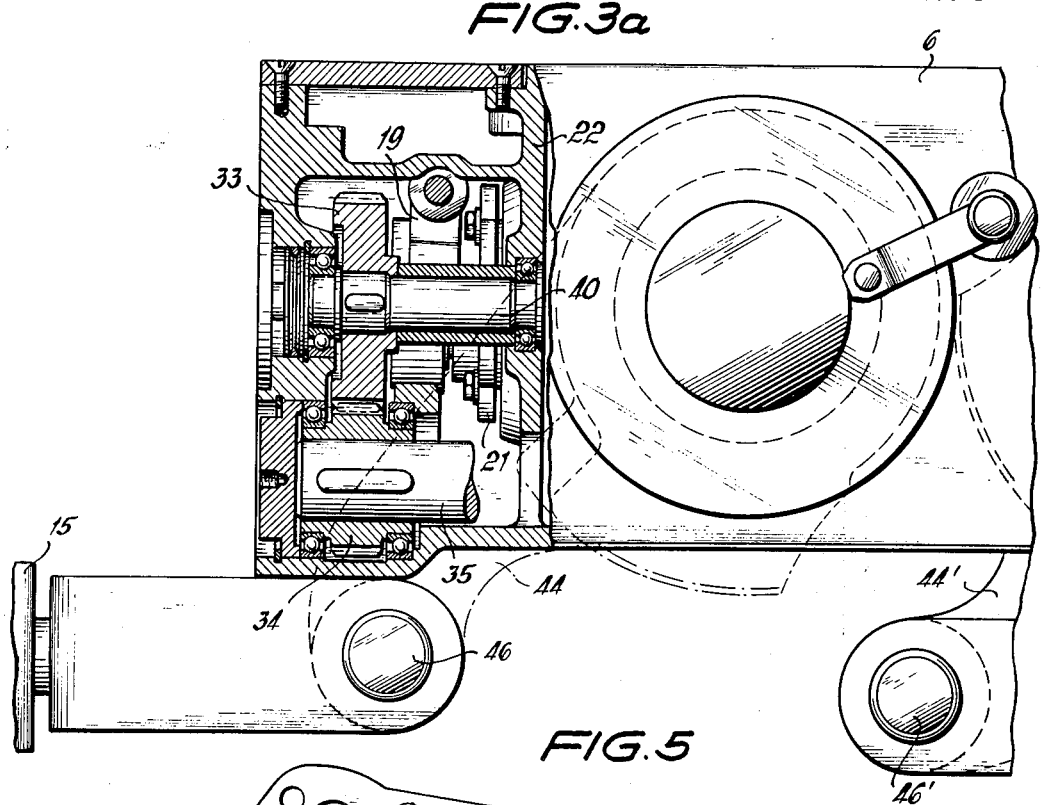

FIGS. 3a and 3b constitute a side view and partial section taken along the line III—III of FIG. 2.

FIG. 4 is a section taken along the line IV—IV of FIG. 2.

Figure 5:
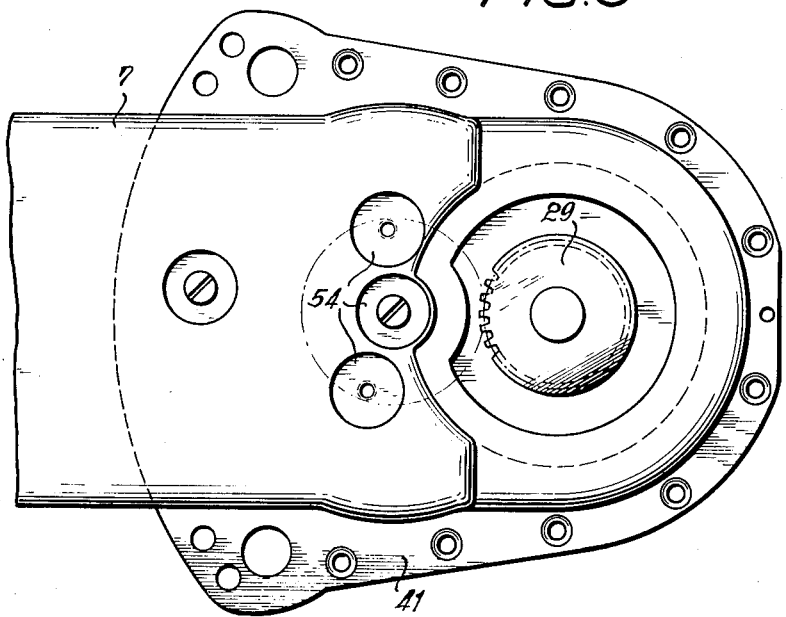

FIG. 5 illustrates a detail of a supporting arm for the cutting roller.

*General arrangement*

The present invention concerns a coal cutting machine with two cutting rollers journalled on laterally provided supporting arms and adjustable as to height, by means of which the coal seam is mined in both directions of movement of the coal cutting machine. The coal cutting machine according to the present invention is characterized primarily in that the tiltable axles for the lateral supporting arms for the cutting rollers are each designed as a hollow shaft rotatably journalled in approximately the plane of the two side walls of the cutter head. The said hollow shaft has a passage in its wall into which extends a shaft from the adjacent end face of the cutter head. The last mentioned shaft is drivingly connected to a drive motor at said end face of the cutter head and is adapted through the intervention of a pair of bevel gears located in the bore of said hollow shaft to convey the rotary movement of the drive motor to a spur gear-equipped shaft journalled in said hollow shaft.

*Structural arrangement*

Figure 1:
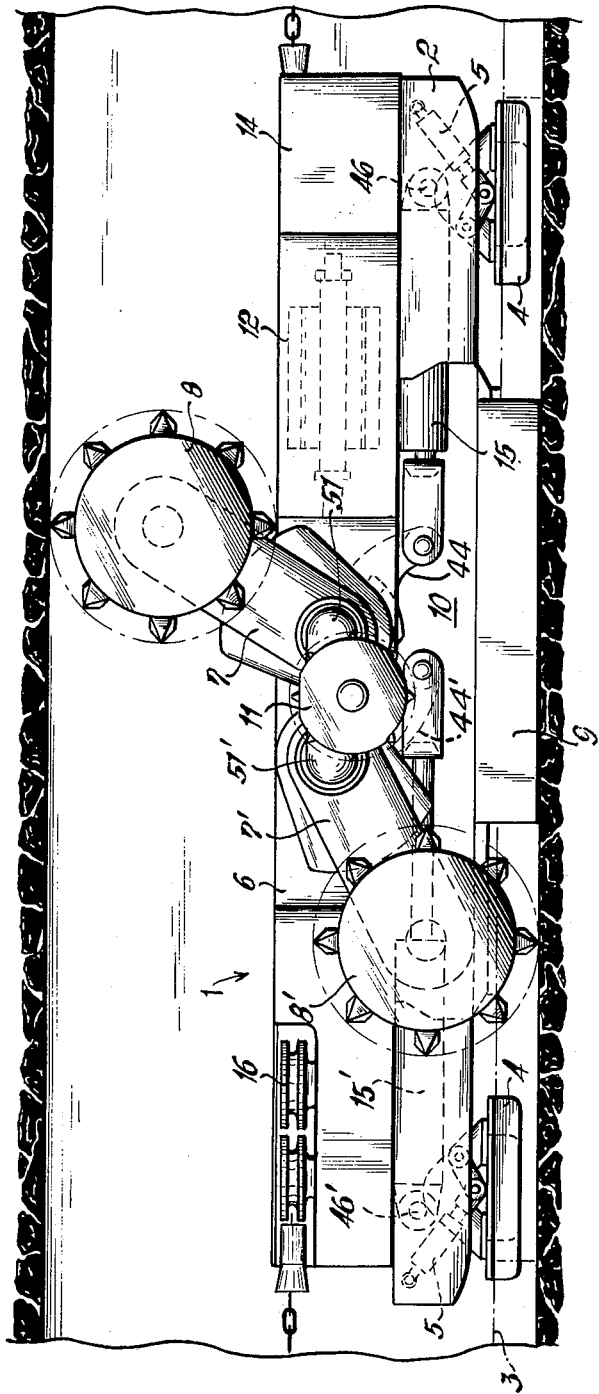
FIG. 1 is a side view of a coal cutting machine according to the invention provided with two coal cutting rollers journalled on lateral supporting arms, said side view being seen from the coal face.

Referring now to the drawings in detail and FIG. 1 thereof in particular, the coal cutting machine 1 illustrated therein rests on a slide 2 which is provided with skids 4 resting on a long wall conveyor 3. On the mine filling side of the coal cutting machine, lifting cylinders 5 are connected to the skids 4. By means of said lifting cylinders 5, the coal cutting machine is tiltable laterally to a limited extent about a longitudinal axis. The tilting is accomplished by lowering the skids 4 on one side of the machine while the skids on the other side are not moved. In this way the machine can be tilted laterally in either direction. In this connection, this known tilting is illustrated in my issued Patent No. 3,136,535. By means of this tilting movement, the coal cutting rollers may be adjusted as to different angles with regard to the coal face.

Approximately in the center portion of the housing of the coal cutting machine, there is provided the cutter head 6 which on the coal face side carries two supporting arms 7, 7' which are tiltable about horizontal shafts 24 (FIG. 2). The ends of said supporting arms 7, 7' have respectively journalled thereon cutting rollers 8, 8'. During the mining operation of the machine, the front cutting roller 8' (when looking in advancing direction of the machine) cuts the coal layer at the bottom, whereas the rear cutting roller 8 cuts the coal at the roof.

The coal cut by the cutting rollers drops onto a transverse conveyor 9 the width of which extends from the front cutting roller 8' to an area below the rear cutting roller 8. Transverse conveyor 9 conveys the coal cut by the rollers 8, 8' and passing therebetween, below the coal cutting machine 1 through an opening 10 of the slide 2 and conveys the cut coal to the long wall conveyor 3. In order not to impede the transport of the coal by the long wall conveyor 3, the coal cutting machine 1 is by means of the slide 2 held at a corresponding distance above the long wall conveyor 3 so that the coal can be withdrawn either toward one or the other side in conformity with the direction of movement of the conveyor 3. A conveyor arrangement of this type is known and is illustrated in my issued Patent No. 3,136,535.

For purposes of limiting the size of the coal pieces reaching the transverse conveyor 9, a further small cutting roller 11 is provided between the cutting rollers 8 and 8'. This smaller cutting roller 11 is located in the vertical plane of symmetry of the cutter head 6. The roller 11 is similar to the cutting rollers proper equipped with cutting tools for cutting down the material broken loose and for aiding in the transport of the material to the transverse conveyor 9.

The arrangement shown by way of example in the drawing is equipped with a single drive motor 12 only which has its shaft section 13 (FIG. 2) extending into the cutter head 6. On the other side of the motor the shaft section thereof extends into a box 14 and is drivingly connected to a fluid pump therein which supplies fluid under pressure to the lifting cylinders 5 of the skids 4 and to fluid pressure cylinder piston systems 15, 15' which are located below the bottom of the machine 1, said pressure fluid cylinder piston systems being located above that side wall of the long wall conveyor 3 which is adjacent the filling side.

On that end face of the cutter head 6 which is remote from the box 14 there is provided winch means 16 for imparting a movement upon the coal cutting machine by drivingly engaging a chain or cable anchored at its ends. This winch means is likewise driven by the motor 12.

The shaft section 13 of the motor 12 (FIG. 2) is adapted to be drivingly connected through a gear 17 and clutch 19 with the coal cutters 8 and 11 through a bevel gear drive 20, 25, 26, 28 and spur gears 29, 30, 31, 48 and 49. Clutch 19 is manually operable by means of a lever 18.

Shaft 20 is journalled in a bushing 21 in a housing wall 22 of the cutter head 6 and through a cut out 23 in hollow shaft 24 partially extends into the rotatably journalled hollow shaft 24. Within the hollow shaft 24 there is provided the above mentioned bevel gear pair 25, 26 while shaft 28 is journalled in the bushing 27. That end of shaft 28 which is remote from the bevel gear 26 protrudes beyond the adjacent end of hollow shaft 24 and extends into the supporting arm 7. At said last mentioned end of shaft 28 there is mounted the spur gear 29 which, as will be evident from the preceding description, meshes with the spur gear 30 and through the latter drives the spur gears 31 and 32.

Due to the fact that the gears 29, 30, 31 and 32 are arranged within the arm 7, it is possible by substituting gears of different transmission ratio for the gears in said arm to vary the circumferential speed of the coal cutters driven by said gears. In order to permit such exchange, the wall of the supporting arm is provided with a plurality of bores as is clearly shown in FIG. 5. More specifically, preferably only the gears 29 will be exchanged for the above purpose whereas the gears meshing therewith, namely the gears 30, are adapted selectively to be journalled in either one of the bores 54.

From gear 17 which is keyed to the motor shaft section 13, the drive is conveyed through gears 33 and 34 (FIGS. 2, 3) to shaft 35 which extends over the length of the cutter head 6, and from shaft 35 is conveyed through gears 34', 33' to gear 38. Gear 38 is located inside the housing 16 and transmits the drive to a step-down transmission (not shown), for instance a fluid transmission, which may be drivingly connected to the winch 16. Gear 33' also meshes with a gear 39 and from gear 39, the rotary movement is transmitted through the manually operable clutch 19' to shaft 20' and from the latter through a bevel gear pair corresponding to bevel gear pair 25, 26, to a gear train in the supporting arm 7' and which gear train is the same as that in arm 7, and finally to the cutter roller 8'.

The drive trains to cutter rollers 8, 8' are thus identical from their respective clutches 19, 19' to the respective cutter rollers.

It is, of course, also possible instead of driving the winch 16 through the above transmission, to provide an additional drive motor on that end face of the cutter head 6 on which the winch 16 is located. In this instance, the winch is directly driven from the drive motor and in such an instance would be located behind the additional drive motor with regard to the cutter head 6. When employing a second drive motor, shaft 40' is designed in the same manner as shaft 40 of the other cutter head side. Gear 38 would in this instance be superfluous.

It will be appreciated that if two drive motors are provided, one of the two motors is only under partial load or partially exploited. This is due to the fact that the cutter roller which is in front when looking in the advancing direction of the cutting machine bears a greater load than the cutter roller which is in the rear during this advancing movement of the machine.

In order in such an instance more economically to take advantage of the drive motor which is not under full load, for aiding the other motor in driving the respective front cutter roller, according to the present invention a driving connection may be established between the two motors. Such an arrangement has the advantage that both motors are rigidly coupled to each other and consequently are under uniform load. The available power of the motors is more economically used. The total available driving power will automatically be divided at the correct ratio and distributed to the two cutter rollers.

This is accomplished as shown in FIGURE 1a wherein motor 12 is, as in FIGURE 1, connected to gear 17 by shaft 13. The second motor 12' is similarly connected to gear 39 pertaining to cutter roller 8'. The two motors 12, 12' are drivingly interconnected by way of gears 33', 34', shaft 35 and gears 34, 33. The motors are thus interconnected to rotate in unison and can be energized singly or jointly depending upon the amount of power required, as mentioned before, the cutter rollers 8, 8' can be operated singly or in unison by availing of their respective clutches 19, 19'.

The driving connection between the two cutter rollers in conformity with the present invention has the additional advantage that, when mining soft marketable coal with which a considerably lower driving power suffices, the two cutting rollers may either be driven by one motor only (motor 12 or 12' of FIGURE 1a), or the coal cutting machine may from the very start be equipped with a single drive motor only (motor 12 of FIGURE 1). It is necessary, in any case, to make provisions that a portion of the driving power of the machine may be conveyed to that winch which is located on the motor free cutter head side, or to the hydraulic unit there located which drives the said winch. To this end, a driven shaft may be extended through the end wall of the cutter head into the adjacent winch chamber. This is shown in FIGURE 2 as the extension of shaft 40' which carries gear 38 to drive the transmission for the winch 16.

In order to assure a reliable connection of the supporting arm for the cutter roller with the hollow shaft, according to a further development of the invention, the hollow shaft end widens as is clearly shown in the drawing. More specifically, FIG. 2 shows those ends of the hollow shafts 24, 24' which protrude from the side wall of the cutter head at the coal face side provided with broadened sections 41, 41' designed as a flange with fan-like radiating portions. It is to these fan-like sections that the supporting arms 7, 7' are connected by means of bolts 60, 61. The journalling of the two hollow shafts 24, 24' is effected on both sides of the cutter head housing by means of bushings 42 on the coal face side and by means of antifriction bearings 43 on the filling side. As will be particularly clearly evident from FIG. 2, it is by means of this particular type of journalling that the maximum spacing between the support bearings for shafts 24, 24' will be obtained. For purposes of lifting and lowering the cutting rollers 8, 8', it is necessary that the hollow shafts 24, 24' be able to carry out a tilting movement of about 90°. The cut-outs 23 accordingly extend over a circumferential section in excess of 90°.

The torque for lifting and lowering the cutting rollers is transmitted to the hollow shafts through the intervention of tiltable arms 44, 44'. These arms are non-rotatably connected to the tapered smaller ends of the hollow shafts 24, 24' and in addition thereto are operatively connected to fluid pressure operable cylinder piston systems 15, 15'. The tilting arms 44, 44' extend through a bottom opening 45 downwardly from cutter head 6 (FIG. 3). One member of the cylinder piston systems 15, 15' is pivotally connected to the respective adjacent tilting arm for the cutter roller pertaining thereto whereas the other member of the cylinder piston systems 15, 15' is pivotally connected to a pivot 46, 46' carried by the slide.

In order to separate the inner chamber of the cutter head 6 which houses the transmission parts from that part of the cutter head in which the bottom opening is provided, a partition 47 (FIG. 2) extends in the longitudinal direction of the cutter head 6.

The cutter roller 11 which is not adjustable as to its location is driven by shaft 28 within the supporting arm 7. To this end, shaft 28 is addition to gear 29 has mounted thereon a further gear 48 (FIG. 2). Gear 48 meshes with a gear 49 which is connected to the cutter roller 11. The cutter roller 11 is supported by a shaft 36 which is nonrotatably mounted in housing 50 (FIG. 4). On housing 50 there are arranged laterally protruding eye-shaped extensions 51, 51' (FIGS. 1, 2) which coaxially with the hollow shafts 24, 24' extend into the supporting arms 7, 7' and sealingly engage the same without impeding the tilting movement of the arm 7, 7'. The inner chamber of the supporting arms 7, 7' is at the entrance of the eye-shaped extention sealed in an oil-tight manner. Furthermore, the housing 50 is by means of bolts 52 connected to the side walls of the cutter head, the bolts 52 extending through extensions 53, 53'.

As will be evident from the above, due to the fact that the tilting shaft fixedly connected to the supporting arms is designed as hollow shaft, the advantage is obtained that the distance between the bearings 43 and 61 can be enlarged up to the width of the machine housing, in other words to a maximum for the respective width of the machine. This arrangement furthermore brings about the advantage that the high speed motor movement can be conveyed to the supporting arms of the cutter rollers by means of a single bevel gear pair as a result of which the inner chamber of the cutter head will remain substantially free from transmission members. The overall length of the cutter head can furthermore be dimensioned relatively short inasmuch as it has to house primarily the hollow shafts only and no additional transmission members.

It will also be evident from the above that by employing the additional cutting roller 11 between the cutting rollers proper 8 and 8', the mined coal will be broken down for the further transport and the space between the two cutter rollers will be kept free while an additional breaking device at the end of the long wall conveyor will be superfluous.

It is, of course, to be understood that the present invention is, by no means, limited to the particular construction shown in the drawings but also comprises any modifications within the scope of the appended claims.

What I claim is:

1. A coal cutting machine having a coal cutting head with a plurality of coal cutting units, in which each of said units comprises: bearing means respectively provided at opposite sides of said coal cutting head, hollow shaft means rotatably journalled in said bearing means and having a circumferential area thereof between said bearing means provided with passage means therethrough, first drive shaft means adapted to be connected to prime mover means and extending through said passage means into said hollow shaft means, second drive shaft means rotatably journalled within said hollow shaft means and drivingly connected to said first drive shaft means, arm means arranged on one side of said hollow shaft means and connected thereto for rotative movement therewith, coal cutting roller means rotatably supported by said arm means, and means drivingly connecting said coal cutting roller means with said second drive shaft means.

2. A coal cutting machine having a coal cutting head with a plurality of coal cutting units, in which each of said units comprises: bearing means respectively provided at opposite sides of said coal cutting head, hollow shaft means rotatably journalled in said bearing means and having a circumferential area thereof between said bearing means provided with passage means therethrough, first drive shaft means adapted to be connected to prime mover means and extending through said passage means into said hollow shaft means, second drive shaft means rotatably journalled within said hollow shaft means and drivingly connected to said first drive shaft means, first arm means arranged on one side of said hollow shaft means and connected thereto for rotative movement therewith, coal cutting roller means rotatably supported by said first arm means, means drivingly connecting said coal cutting roller means with said second drive shaft means, second arm means connected to the other side of said hollow shaft means, and fluid operable motor means operatively connected to said second arm means for actuating the same, the diameter of that section of said hollow shaft means which is adjacent said second arm means being considerably less than the diameter of that section of said hollow shaft means which is adjacent said first arm means.

3. A coal cutting machine according to claim 2, which includes partition means separating the connection of said second arm means with said hollow shaft means from said driving shaft means and the parts drivingly connected thereto.

4. A coal cutting machine having a coal cutting head with a plurality of coal cutting units, in which each of said units comprises: bearing means respectively provided at opposite sides of said coal cutting head, hollow shaft means rotatably journalled in said bearing means and having a circumferential area thereof between said bearing means provided with passage means therethrough, first drive shaft means extending through said passage means into said hollow shaft means, second drive shaft means rotatably journalled within said hollow shaft means and drivingly connected to said first drive shaft means, arm means arranged on one side of said hollow shaft means and connected thereto for rotative movement therewith, coal cutting roller means rotatably supported by said arm means, means drivingly connecting said coal cutting roller means with said second drive shaft means, and means for drivingly interconnecting the first drive shaft means of all of said units.

5. A coal cutting machine having a coal cutting head with two coal cutting units, in which each of said units comprises: bearing means respectively provided at opposite sides of said coal cutting head, hollow shaft means rotatably journalled in said bearing means and having a circumferential area thereof between said bearing means provided with passage means therethrough, first drive shaft means extending through said passage means into said hollow shaft means, second drive shaft means rotatably journalled within said hollow shaft means and drivingly connected to said first drive shaft means, first arm means arranged on one side of said hollow shaft means and connected thereto for rotative movement therewith, coal cutting roller means rotatably supported by said first arm means, means drivingly connecting said coal cutting roller means with said second drive shaft means, second arm means connected to the other side of said hollow shaft means, fluid operable motor means operatively connected to said second arm means for actuating the same; said coal cutting machine also comprising prime mover means common to both of said units for driving the first drive shaft means thereof, pump means, means drivingly connecting said prime mover means with said pump means and means hydraulically connecting said pump means with the said fluid operable motor means of said units.

6. A coal cutting machine having a coal cutting head with two coal cutting units, in which each of said units comprises: bearing means respectively provided at opposite sides of said coal cutting head, hollow shaft means rotatably journalled in said bearing means and having a circumferential area thereof between said bearing means provided with passage means therethrough, first drive shaft means extending through said passage means into said hollow shaft means, second drive shaft means rotatably journalled within said hollow shaft means and drivingly connected to said first drive shaft means, first arm means arranged on one side of said hollow shaft means and connected thereto for rotative movement therewith, coal cutting roller means rotatably supported by said first arm means, means drivingly connecting said coal cutting roller means with said second drive shaft means, second arm means connected to the other side of said hollow shaft means, fluid operable motor means operatively connected to said second arm means for actuating the same; said coal cutting machine also comprising prime mover means common to both of said units for driving the first shaft means thereof, pump means connected to said prime mover means, means hydraulically connecting said pump means with the fluid motor means of said units, winch means operatively connected to said coal cutting machine for advancing the same, and means for selectively drivingly connecting said winch means to said prime mover for actuating said winch means.

7. A coal cutting machine having a coal cutting head with a plurality of coal cutting units, in which each of said units comprises: bearing means respectively provided at opposite sides of said coal cutting head, hollow shaft means rotatably journalled in said bearing means and having a circumferential area thereof between said bearing means provided with passage means therethrough, first drive shaft means adapted to be connected to prime mover means and extending through said passage means into said hollow shaft means, second drive shaft means rotatably journalled within said hollow shaft means and drivingly connected to said first drive shaft means, arm means arranged on one side of said hollow shaft means and connected thereto for rotative movement therewith, said one side of said hollow shaft means being enlarged to form a fan-shaped portion for facilitating connection of said arm means to said hollow shaft means, coal cutting roller means rotatably supported by said arm means, and means drivingly connecting said coal cutting roller means with said second drive shaft means.

8. A coal cutting machine having a coal cutting head with a plurality of coal cutting units, in which each of said units comprises: bearing means respectively provided at opposite sides of said coal cutting head, hollow shaft means rotatably journalled in said bearing means and having a circumferential area thereof between said bearing means provided with passage means therethrough, first drive shaft means adapted to be connected to prime mover means and extending through said passage means into said hollow shaft means, second drive shaft means rotatably journalled within said hollow shaft means and drivingly connected to said first drive shaft means, arm means arranged on one side of said hollow shaft means and connected thereto for rotative movement therewith, coal cutting roller means rotatably supported by said arm means, and gear train means drivingly connecting said coal cutting roller means with said second drive shaft means, said gear train means including a first gear exchangeably mounted on said second shaft means and also including a second gear exchangeably supported by said arm means and drivingly connected to said first gear, said arm means being provided with a plurality of bores for receiving and supporting a gear differently dimensioned from said second gear in substitution thereof.

9. A coal cutting machine having a coal cutting head with a plurality of coal cutting units, in which each of said units comprises: bearing means respectively provided at opposite sides of said coal cutting head, hollow shaft means rotatably journalled in said bearing means and having a circumferential area thereof between said bearing means provided with passage means therethrough, first drive shaft means adapted to be connected to prime mover means and extending through said passage means into said hollow shaft means, second drive shaft means rotatably journalled within said hollow shaft means and drivingly connected to said first drive shaft means, arm means arranged on one side of said hollow shaft means and connected thereto for rotative movement therewith, coal cutting roller means rotatably supported by said arm means, means drivingly connecting said coal cutting roller means with said second drive shaft means; said coal cutting machine also comprising additional coal cutting roller means interposed between the other coal cutting roller means of said units but smaller in diameter than the latter; and means drivingly connecting said additional coal cutting roller means with the second driving shaft means of one of said units.

10. A coal cutting machine according to claim 9, which includes supporting means connected to said cutting head for supporting said additional coal cutting roller means, said supporting means including means having an extension extending into the supporting arm means of said units and being centrically located with regard to said hollow shaft means thereof.

References Cited by the Examiner
UNITED STATES PATENTS
2,967,701   1/1961   Wilcox _____ 299—53 X BENJAMIN HERSH, *Primary Examiner.*